United States Patent
Ovalekar et al.

(10) Patent No.: US 6,611,494 B1
(45) Date of Patent: Aug. 26, 2003

(54) ORTHOGONAL SEQUENCE GENERATOR

(75) Inventors: Sameer V. Ovalekar, Allentown, PA (US); Xiao-An Wang, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/314,834

(22) Filed: May 19, 1999

(51) Int. Cl.[7] ............................................... H04J 11/00
(52) U.S. Cl. ...................... 370/208; 370/342; 375/130
(58) Field of Search ................................. 370/203, 208, 370/209, 335, 342, 441, 320, 337; 375/130, 150, 242, 341, 142, 152, 145, 295

(56) References Cited

U.S. PATENT DOCUMENTS

| | | | | |
|---|---|---|---|---|
| 5,887,035 A | * | 3/1999 | Molnar ........................ | 375/340 |
| 5,920,591 A | * | 7/1999 | Fukasawa et al. .......... | 370/320 |
| 5,978,955 A | * | 11/1999 | Sharma ...................... | 708/492 |
| 6,345,069 B1 | * | 2/2002 | Dabak et al. ............... | 375/152 |

* cited by examiner

Primary Examiner—Dang Ton
Assistant Examiner—Phuc Tran
(74) Attorney, Agent, or Firm—Steve Mendelsohn; Ian M. Hughes

(57) ABSTRACT

A set of orthogonal sequences (e.g., Hadamard sequences) is decomposed into a set of basis vectors and sets of coefficients, where each set of coefficients represents a particular "vector combination" of the basis vectors that forms one of the orthogonal sequences. Such decomposition of orthogonal sequences into basis vectors and sets of coefficients may allow for a reduction in memory space and/or processing required to generate one or more of the orthogonal sequences during real-time operations of a communications system, such as an IS-95 CDMA system, that employs the orthogonal sequences. In one embodiment, a Hadamard sequence generator includes a controller, a memory, and a combiner. The set of basis vectors are stored in the memory, and each of the Hadamard sequences has a corresponding set of coefficients from which the Hadamard sequence can be derived as a vector combination of the basis vectors. These coefficients are either also stored in memory, or known to the controller based on a relationship between the coefficients and the row number of the Hadamard sequence in a corresponding Walsh-Hadamard matrix. To generate a particular sequence, the controller determines the corresponding set of coefficients and causes the basis vectors to be provided to the combiner. Based on the set of coefficients, the combiner combines the elements of specific basis vectors using modulo-2 addition to generate the desired Hadamard sequence.

31 Claims, 3 Drawing Sheets

ORTHOGONAL SEQUENCE GENERATOR

BACKGROUND OF THE INVENTION

1. Field of the Invention

The present invention relates to code division, multiple-access (CDMA) telecommunication systems, and, more particularly, to a sequence generator for generating orthogonal sequences in a CDMA transceiver.

2. Description of the Related Art

Several code division, multiple-access (CDMA) standards have been proposed. One such standard is the IS-95 standard adopted for cellular telephony. As with many CDMA systems, an IS-95 CDMA system employs (a) a pilot channel for system timing and base station identification and (b) one or more data channels (also known as message channels) for transmitting data between a base station and various remote units (also referred to herein as users) communicating with the base station.

FIG. 1 shows a block diagram of a portion of a transmitter 100 that is implemented in each base station and each user in an IS-95 CDMA system. Combiner 103 combines a stream of data, generated by data processor 101, with an assigned pseudo-noise (PN) code sequence, generated by PN code generator 102, to spread the frequency of the data stream over a particular frequency range. Combiner 105 then combines the frequency-spread data stream, generated by combiner 103, with an orthogonal sequence, generated by orthogonal sequence generator 104, to generate a channel signal for transmission. The intended receiver of the resulting transmitted channel signal has analogous combiners that reverse the processing of transmitter 100 to recover the original data stream from the received channel signal. Assigning different orthogonal sequences to different channels (including the pilot channel) allows multiple channel signals to be transmitted over a single frequency range, where each receiver can recover any of the original data streams using the assigned PN code sequence and the appropriate corresponding orthogonal sequence.

IS-95 CDMA systems use particular sets of orthogonal sequences called Hadamard sequences. A set of Hadamard sequences corresponds to the rows of a Walsh-Hadamard matrix, which can be generated using the recursive relation of Equation (1) as follows:

$$W_{2n} = \begin{bmatrix} W_n & W_n \\ W_n & \overline{W_n} \end{bmatrix} \quad (1)$$

where n is an integer greater than zero, each element of matrix $\overline{W_n}$ is the logical negation of the corresponding element of matrix $W_n$, and $W_1=[0]$. The elements of a Walsh-Hadamard matrix are logical "1"s and "0"s, where the logical negation of a "1" is "0", and the logical negation of a "0" is "1". The orthogonal sequences used by the transmitters and receivers in a typical IS-95 CDMA system are the 64-bit Hadamard sequences corresponding to the 64 rows of the 64-by-64 Walsh-Hadamard matrix generated using Equation (1).

FIG. 2 shows a typical circuit 200 for generating Hadamard sequences during real-time signal processing in a transmitter or receiver of an IS-95 CDMA system. Circuit 200 may be used to implement orthogonal sequence generator 104 of transmitter 100 of FIG. 1. In a typical IS-95 CDMA system, the 64 different 64-bit Hadamard sequences are stored in read-only memory (ROM) 202 as a 4 Kbit (i.e., 64*64 bits) lookup table, where controller 201 accesses a particular Hadamard sequence in ROM 202 based on a predetermined addressing scheme for the lookup table. In alternative implementations of orthogonal sequence generator 104, the Hadamard sequences may be generated (1) using a software program executed in, for example, a digital signal processor (DSP) or (2) in hardware, for example, by an application specific integrated circuit (ASIC). In either case, the Hadamard sequences may be generated by implementing in real time the recursive Walsh-Hadamard matrix relationship given in Equation (1).

Plans are currently underway for CDMA systems, such as the so-called wideband CDMA systems, that are based on larger and larger Hadamard sequences in order to allow a greater and greater number of channel signals to be transmitted simultaneously over the same frequency range. For example, CDMA systems are currently being designed based on 256-bit and even 512-bit Hadamard sequences. In sequence generators based on implementations such as circuit 200 of FIG. 2, the memory required to store the corresponding lookup tables of Hadamard sequences may be prohibitively large (i.e., 64 Kbits for the 256 different 256-bit Hadamard sequences and 256 Kbits for the 512 different 512-bit Hadamard sequences). Similarly, in software and hardware implementations that rely on the real-time generation of the Walsh-Hadamard matrix, the processing required to generate these larger sequences may be prohibitively expensive in terms of cost, power, circuit layout area, and/or time.

SUMMARY OF THE INVENTION

The present invention relates to an efficient technique for generating Hadamard sequences, that can be implemented using (1) less memory space than that required for an corresponding implementation that relies on a lookup table containing all of the Hadamard sequences and (2) simpler processing than that required for a corresponding software or hardware implementation that relies on real-time generation of the corresponding Walsh-Hadamard matrix. According to embodiments of the invention, the set of Hadamard sequences are decomposed into a smaller set of basis vectors that can be combined in real time to generate any of the original Hadamard sequences. The memory needed to store the smaller set of basis vectors is less than that required to store the corresponding entire lookup table of Hadamard sequences, and the processing needed to generate any of the Hadamard sequences using the basis vectors is simpler than that required to generate the corresponding Walsh-Hadamard matrix in real time.

According to one embodiment, the present invention is processes a communications signal by providing a set of n basis vectors corresponding to a set of m sequences, n being less than m, and a set of coefficients corresponding to a selected sequence of the m sequences. The selected sequence is generated using the set of n basis vector and the set of coefficients and the communications signal is then processed using the selected sequence.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In the following discussion, the present invention is described in the context of processing implemented by the transmitters and receivers of CDMA systems, such as IS-95 CDMA systems, that use Hadamard sequences to encode data streams into channel signals for transmission and to decode received channel signals to recover the original data streams, respectively. For simplicity, the particular context is of an exemplary CDMA system that employs the eight different 8-bit Hadamard sequences that correspond to the rows of the 8×8 Walsh-Hadamard matrix generated according to Equation (1). In reality, the present invention would more likely be implemented in the context of CDMA systems employing Hadamard sequences having at least 64 bits per sequence, and possibly Hadamard sequences having 256 or 512 or even more bits per sequence. Those skilled in the art will understand, however, that the present invention can also be implemented in the context of other communications systems, including CDMA systems other than IS-95 CDMA systems, that use orthogonal sequences other than Hadamard sequences.

The eight different 8-bit Hadamard sequences that correspond to the rows of the 8×8 Walsh-Hadamard matrix are shown in Table 1. Each row number may be considered as an index value identifying the corresponding sequence in the Walsh-Hadamard matrix. According to the present invention, these eight Hadamard sequences can be decomposed into a set of basis vectors that are used during real-time receiver processing to generate any of the eight original Hadamard sequences, using a procedure to be described later. Those skilled in the art will understand that the present invention may also be employed to generate sets of non-orthogonal sequences if the non-orthogonal sequences can be decomposed into basis vectors

TABLE 1

| Row | Hadamard Sequence |
|-----|-------------------|
| 0 | 0 0 0 0 0 0 0 0 |
| 1 | 0 1 0 1 0 1 0 1 |
| 2 | 0 0 1 1 0 0 1 1 |
| 3 | 0 1 1 0 0 1 1 0 |
| 4 | 0 0 0 0 1 1 1 1 |
| 5 | 0 1 0 1 1 0 1 0 |
| 6 | 0 0 1 1 1 1 0 0 |
| 7 | 0 1 1 0 1 0 0 1 |

Figure 3:
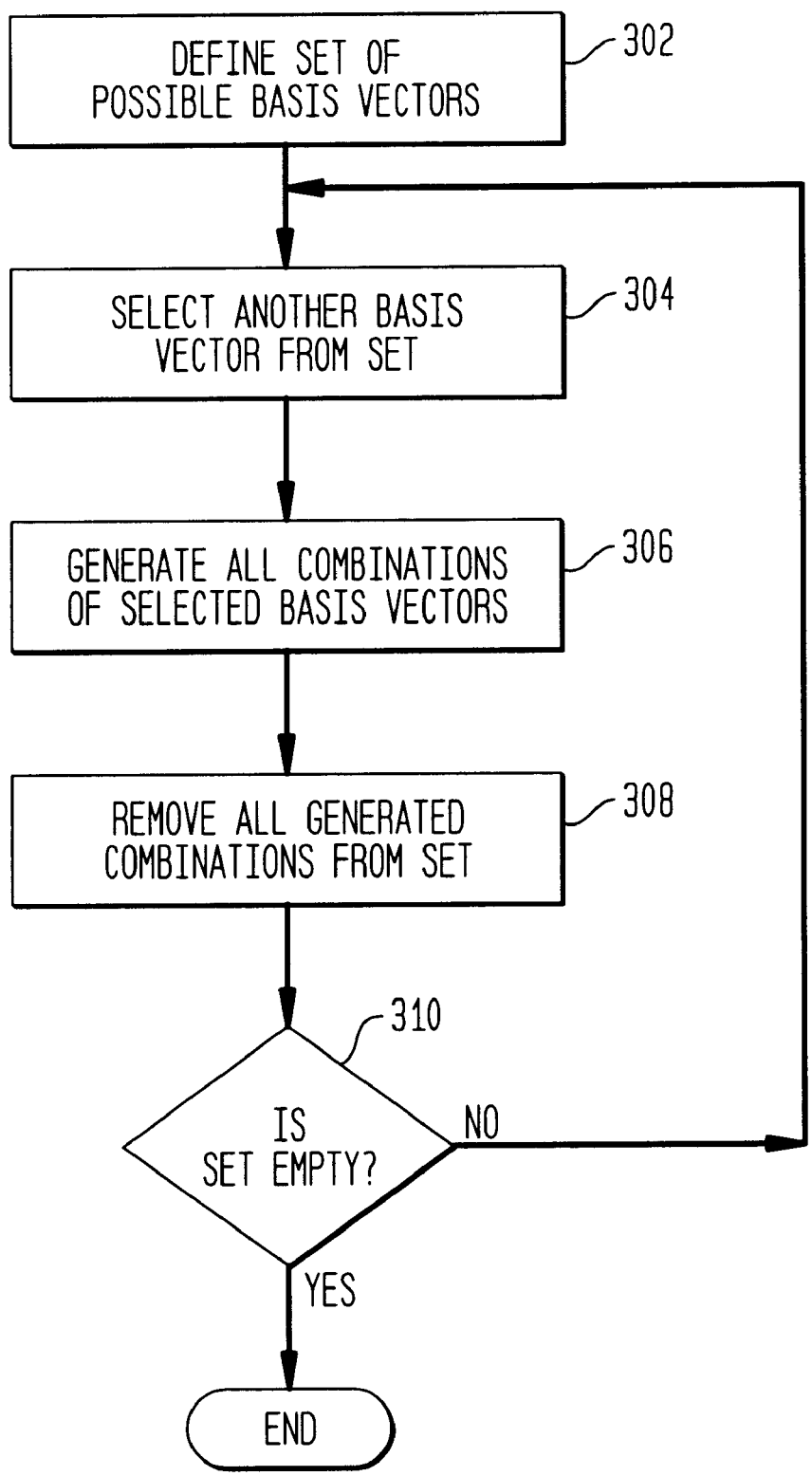
FIG. 3 shows a flow diagram of one possible process for generating a set of basis vectors for any given set of Hadamard sequences.

FIG. 3 shows a flow diagram of one possible process for generating a set of basis vectors for any given set of Hadamard sequences. The processing begins in step 302 with the definition of a set of possible basis vectors from the original set of Hadamard sequences. According to a preferred embodiment of the present invention, the set of possible basis vectors consists of the vectors corresponding to all of the Hadamard sequences with the exception of the Row 0 Hadamard sequence, which, based of Equation (1), will always consist of all zeros. Thus, for the example of the 8-bit Hadamard sequences, the set of possible basis vectors defined in step 302 consists of vectors corresponding to the Hadamard sequences in Rows 1–7 of Table 1.

In step 304, one of the vectors in the set of possible basis vectors is selected as an actual basis vector. In general, any one of the vectors in the set can be selected in step 304. In a preferred implementation, however, the vector corresponding to the next available sequence in the corresponding table of sequence is always selected. In the case of Table 1, the first selected basis vector B0 corresponds to the Hadamard sequence of Row 1.

In step 306, all combinations of the basis vectors selected so far in the processing are generated, where each combination corresponds to the modulo-2 addition of the products of each basis vector and a corresponding coefficient, where each coefficient is either 0 or 1. According to the modulo-2 addition operation, which is represented herein by the symbol "$\oplus$", $0\oplus 0=0$, $0\oplus 1=1$, $1\oplus 0=1$, and $1\oplus 1=0$. Note that during the processing of step 306, the logical "0"s and "1"s in the Hadamard sequences are treated numerically as having binary values 0 and 1, respectively. Since, at this point in the processing of the current example, there is only one selected basis vector (i.e., Row 1 of Table 1), the following two combinations are possible:

(1) 0*B0=0*(0 1 0 1 0 1 0 1)=(0 0 0 0 0 0 0 0), which corresponds to Row 0 of Table 1, and (2) 1*B0=1*(0 1 0 1 0 1 0 1)=(0 1 0 1 0 1 0 1), which corresponds to Row 1 of Table 1.

In step 308, each vector currently remaining in the set of possible basis vectors that corresponds to one of the generated combinations is removed from the set. In the case of Table 1, the vector corresponding to Row 1 is removed from the set (the vector corresponding to Row 0 having previously been removed in step 302), leaving the set with only those vectors corresponding to Rows 2–7 remaining.

Since the set is not empty (step 310), processing returns to step 304 to select another vector from the set. Again, although in general any one of the vectors could be selected, in a preferred implementation, the vector corresponding to the next available sequence is selected. In the current example, at this point in the processing, the vector corresponding to Row 2 in Table 1 is selected as the second selected basis vector B1.

At this point in the processing, with two selected basis vectors B0 and B1, the four following combinations are generated in step 306:

(1) 0*B1$\oplus$0*B0=0*(0 0 1 1 0 0 1 1)$\oplus$0*(0 1 0 1 0 1 0 1)=(0 0 0 0 0 0 0 0)$\oplus$(0 0 0 0 0 0 0 0)=(0 0 0 0 0 0 0 0), which corresponds to Row 0 of Table 1, (2) 0*B1$\oplus$1*B0=0*(0 0 1 1 0 0 1 1)$\oplus$1*(0 1 0 1 0 1 0 1)=(0 0 0 0 0 0 0 0)$\oplus$(0 1 0 1 0 1 0 1)=(0 1 0 1 0 1 0 1), which corresponds to Row 1 of Table 1, (3) 1*B1$\oplus$0*B0=1*(0 0 1 1 0 0 1 1)$\oplus$0*(0 1 0 1 0 1 0 1)=(0 0 1 1 0 0 1 1)$\oplus$(0 0 0 0 0 0 0 0)=(0 0 1 1 0 0 1 1), which corresponds to Row 2 of Table 1, and (4) 1*B1$\oplus$1*B0=1*(0 0 1 1 0 0 1 1)$\oplus$1*(0 1 0 1 0 1 0 1)=(0 0 1 1 0 0 1 1)$\oplus$(0 1 0 1 0 1 0 1)=(0 1 1 0 0 1 1 0), which corresponds to Row 3 of Table 1.

In step 308, the vectors corresponding to Rows 2 and 3 are removed from the set of possible basis vectors, leaving the vectors corresponding to Rows 4–7 as the only vectors remaining in the set. Since the set is still not empty, processing returns to step 304, where the vector corresponding to Row 4 (the next available row in Table 1) is preferably selected as the third basis vector B2.

In step 306, since there are now three different basis vectors, there are 8 possible combinations:

(1) $0^*B2 \oplus 0^*B1 \oplus 0^*B0 = \ldots = (0\ 0\ 0\ 0\ 0\ 0\ 0\ 0)$, which corresponds to Row 0 of Table 1, (2) $0^*B2 \oplus 0^*B1 \oplus 1^*B0 = \ldots = (0\ 1\ 0\ 1\ 0\ 1\ 0\ 1)$, which corresponds to Row 1 of Table 1, (3) $0^*B2 \oplus 1^*B1 \oplus 0^*B0 = \ldots = (0\ 0\ 1\ 1\ 0\ 0\ 1\ 1)$, which corresponds to Row 2 of Table 1, (4) $0^*B2 \oplus 1^*B1 \oplus 1^*B0 = \ldots = (0\ 1\ 1\ 0\ 0\ 1\ 1\ 0)$, which corresponds to Row 3 of Table 1, (5) $1^*B2 \oplus 0^*B1 \oplus 0^*B0 = \ldots = (0\ 0\ 0\ 0\ 1\ 1\ 1\ 1)$, which corresponds to Row 4 of Table 1, (6) $1^*B2 \oplus 0^*B1 \oplus 1^*B0 = \ldots = (0\ 1\ 0\ 1\ 1\ 0\ 1\ 0)$, which corresponds to Row 5 of Table 1, (7) $1^*B2 \oplus 1^*B1 \oplus 0^*B0 = \ldots = (0\ 0\ 1\ 1\ 1\ 1\ 0\ 0)$, which corresponds to Row 6 of Table 1, and (8) $1^*B2 \oplus 1^*B1 \oplus 1^*B0 = \ldots = (0\ 1\ 1\ 0\ 1\ 0\ 0\ 1)$, which corresponds to Row 7 of Table 1.

In step 308, the vectors corresponding to Rows 4–7 of Table 1 are removed from the set of possible basis vectors, leaving no vectors remaining in the set. As such, when step 310 is next implemented, the answer will be "yes," and the processing of FIG. 3 will terminate.

As seen in this example, the processing of FIG. 3 decomposes the eight 8-bit Hadamard sequences of Table 1 into the three basis vectors B0, B1, and B2 corresponding to Rows 1, 2, and 4 of Table 1, respectively. These three basis vectors can be used to generate any of the eight original Hadamard sequences using a "vector combination" operation, represented herein by the symbol "$\otimes$", that is based on the same type of operations used to generate the combinations of vectors in step 306 of FIG. 3, as follows:

Row $0 = 0^*B2 \oplus 0^*B1 \oplus 0^*B0 = (0\ 0\ 0) \otimes (B2\ B1\ B0) = C0 \otimes (B2\ B1\ B0)$, Row $1 = 0^*B2 \oplus 0^*B1 \oplus 1^*B0 = (0\ 0\ 1) \otimes (B2\ B1\ B0) = C1 \otimes (B2\ B1\ B0)$, Row $2 = 0^*B2 \oplus 1^*B1 \oplus 0^*B0 = (0\ 1\ 0) \otimes (B2\ B1\ B0) = C2 \otimes (B2\ B1\ B0)$, Row $3 = 0^*B2 \oplus 1^*B1 \oplus 1^*B0 = (0\ 1\ 1) \otimes (B2\ B1\ B0) = C3 \otimes (B2\ B1\ B0)$, Row $4 = 1^*B2 \oplus 0^*B1 \oplus 0^*B0 = (1\ 0\ 0) \otimes (B2\ B1\ B0) = C4 \otimes (B2\ B1\ B0)$, Row $5 = 1^*B2 \oplus 0^*B1 \oplus 1^*B0 = (1\ 0\ 1) \otimes (B2\ B1\ B0) = C5 \otimes (B2\ B1\ B0)$, Row $6 = 1^*B2 \oplus 1^*B1 \oplus 0^*B0 = (1\ 1\ 0) \otimes (B2\ B1\ B0) = C6 \otimes (B2\ B1\ B0)$, and Row $7 = 1^*B2 \oplus 1^*B1 \oplus 1^*B0 = (1\ 1\ 1) \otimes (B2\ B1\ B0) = C7 \otimes (B2\ B1\ B0)$, where Ci represents the set of three coefficients used to generate the Hadamard sequence in Row i of Table 1.

The results from this example for the set of 8-bit Hadamard sequences suggest certain patterns that apply generally to any set of Hadamard sequences. In general, based on Equation (1), the rows of an M×M Walsh-Hadamard matrix will correspond to M different M-bit Hadamard sequences, where $M=2^n$ and n is an integer greater than 1. According to the present invention, the M Hadamard sequences can be decomposed into as few as n basis vectors, where the preferred set of n basis vectors consists of vectors (B0, B1, B2, ..., B(n−1)), corresponding respectively to Rows $2^0, 2^1, 2^2, \ldots, 2^{n-1}$ of the M×M Walsh-Hadamard matrix (i.e., Rows $1, 2, 4, \ldots, 2^{n-1}$). As such, the preferred set of basis vectors can be selected for any set of Hadamard sequences without having to explicitly perform the processing of FIG. 3. When this preferred set of n basis vectors is selected, the Row i Hadamard sequence can be generated from the n basis vectors using the formula $Ci \otimes (B(n-1) \ldots B2\ B1\ B0)$, where Ci, the set of coefficients, can be derived directly from the binary representation of the decimal value i.

Referring back to the example of the set of 8-bit Hadamard sequences corresponding to the eight rows of the 8×8 Walsh-Hadamard matrix of Table 1, M=8 and n=3. The (n=3) preferred basis vectors generated according to FIG. 3 correspond to Rows 1, 2, and 4 of the 4×4 Walsh-Hadamard matrix, and the set Ci of three coefficients used in the vector combination operation to generate any of the eight original 8-bit Hadamard sequences can be derived directly from the binary representation of the decimal value corresponding to the position (i.e., row number) of that sequence in the matrix. For example, as shown above, the set C5 of three coefficients used to generate the Row 5 Hadamard sequence is (1 0 1), which is the binary representation of decimal 5.

Thus, according to preferred embodiments of the present invention, only n basis vectors corresponding to Rows 1, 2, 4, ..., $2^{n-1}$ of the $2^n \times 2^n$ Walsh-Hadamard matrix need to be stored or otherwise represented in memory in order to generate any of the $2^n$ different $2^n$-bit Hadamard sequences.

Furthermore, the basis vector values may be generated from an initial value, also known as a seed. For example, the n preferred basis vectors correspond to Hadamard sequences that have repetitive bit patterns. The repetitive bit pattern may be the seed. Row 1 of the 8×8 Walsh-Hadamard matrix corresponds to the repetitive bit pattern (0 1) occurring four times. Similarly, Row 2 corresponds to the repetitive bit pattern (0 0 1 1) occurring twice, and Row 4 could be said to correspond to the repetitive bit pattern (0 0 0 0 1 1 1 1) occurring once. This characteristic of the preferred basis vectors enables even further reduction in the memory required to store the n basis vectors, since only the repetitive bit pattern and the number of occurrences of that repetitive bit pattern need to be stored for each basis vector. Other techniques for generating a sequence of values from an initial seed are known in the art. Such seed may be considered the root value of a polynomial, which technique is employed with Galois field mathematics to generate pseudo-noise sequences.

Alternatively, a relatively simple algorithm can be implemented to generate any of the n preferred basis vectors in real time (i.e., real-time processing in which the algorithm simply determines the desired sequence and computes the desired sequence when needed based on program steps). For example, the following pseudocode can be implemented to generate the basis vector $B_j$ for any set of n basis vectors.

For k=1 to $2^{n-j-1}$
    For l=1 to $2^j$, append 0 to sequence
    For l=1 to $2^j$, append 1 to sequence For example, in order to generate the basis vector B1, when n=3, the pseudocode would be implemented as follows:

For k=1 to 2
    For l=1 to 2, add 0 to sequence
    For l=1 to 2, add 1 to sequence thereby generating the sequence (0 0 1 1 0 0 1 1), which is the preferred basis vector B1. This algorithm could be implemented relatively easily either in software or in hardware.

Figure 1:
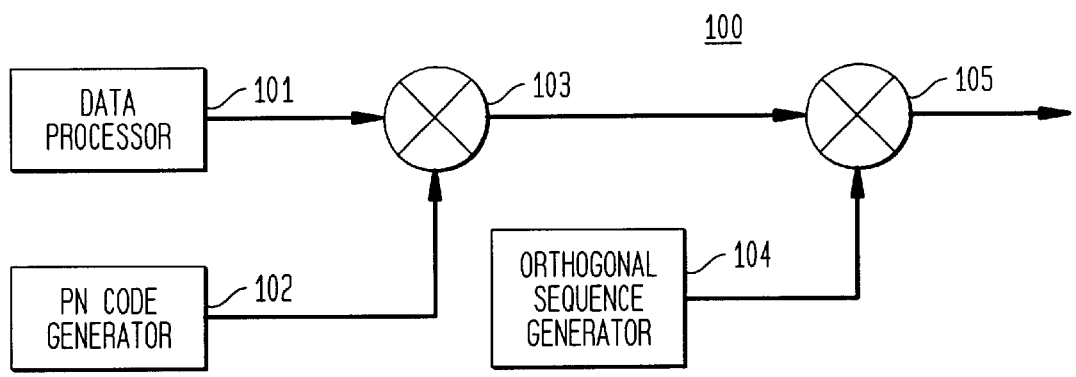
FIG. 1 shows a block diagram of a portion of the transmitter in each base station and each user in an IS-95 CDMA system.
Figure 2:
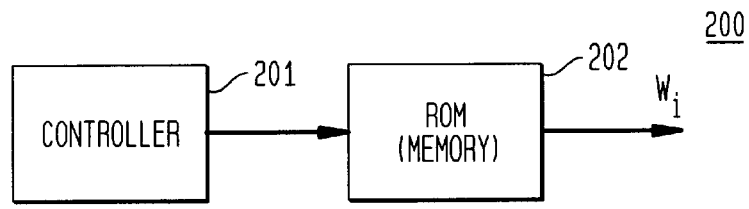
FIG. 2 shows a typical circuit for generating Hadamard sequences in a transmitter or receiver of an IS-95 CDMA system.
Figure 4:
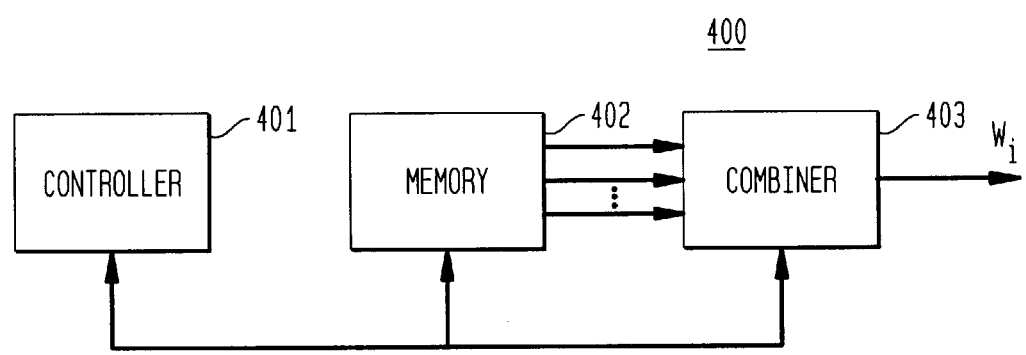
FIG. 4 shows an exemplary circuit of an orthogonal sequence generator in accordance with the present invention.

FIG. 4 shows an exemplary circuit of an orthogonal sequence generator 400, according to one embodiment of the present invention. Generator 400 can be used to implement the orthogonal sequence generators in the transmitters and receivers of a CDMA system, such as orthogonal sequence generator 104 of IS-95 CDMA transmitter 100 of FIG. 1. Orthogonal sequence generator 400 includes a controller 401, memory 402, and combiner 403. In accordance with the present invention, the selected set of basis vectors is stored in memory 402. The different sets of coefficients that are used to generate the Hadamard sequences from the basis vectors may also be stored in memory 402. Alternatively, controller 401 may generate the sets of coefficients in real time based on the relationship between the bit values within each set of coefficients and the row number of the Hadamard sequence in the corresponding Walsh-Hadamard matrix.

Controller 401 receives or generates a request for a particular Hadamard sequence $w_i$ and determines (i.e., generates or retrieves from memory 402) the set Ci of coefficients needed to generate that requested Hadamard sequence $w_i$. Controller 401 provides the set Ci of coefficients to combiner 403 and causes the basis vectors to be provided to the combiner 403, such that, in parallel, the elements of each basis vector are provided serially to combiner 403. That is, the first elements in all n basis vectors are provided to combiner 403 at the same time, followed by the second elements in all n basis vectors, and so on. Combiner 403 performs a vector combination operation on each set of elements from the n basis vectors to generated another element of the requested Hadamard sequence $w_i$.

Figure 5:
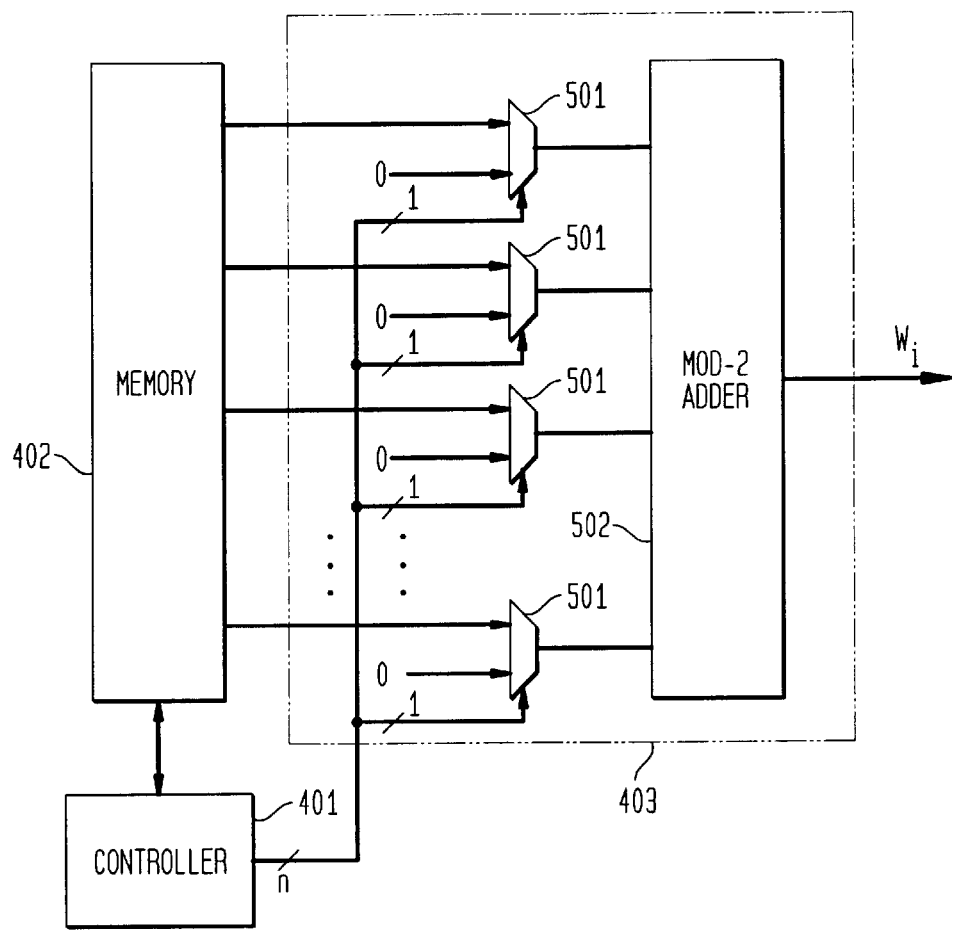
FIG. 5 shows an exemplary embodiment of a combiner for the orthogonal sequence generator of FIG. 3.

FIG. 5 shows an exemplary embodiment of combiner 403 for the orthogonal sequence generator of FIG. 4. Combiner 403 includes a one-bit multiplexer (MUX) 501 for each basis vector and a modulo-2 adder 502. Each basis vector stored in memory 402 is provided serially to one input of a corresponding MUX 501, while a 0 value is provided to the other input of each MUX 501. The output of each MUX 501 is provided to modulo-2 adder 502, which combines the outputs of the MUXs 501, using the modulo-2 addition operation $\oplus$, to generate the requested Hadamard sequence $w_i$. The set Ci of coefficients received from controller 401 is used to control which inputs are transmitted by the MUXs 501. In particular, each coefficient controls a different corresponding MUX 501, such that, if a coefficient is a 0, then the corresponding MUX 501 provides the 0 input to modulo-2 adder 502, and, if a coefficient is a 1, then the corresponding MUX 501 provides the current element of the corresponding basis vector to modulo-2 adder 502.

Figure 6:
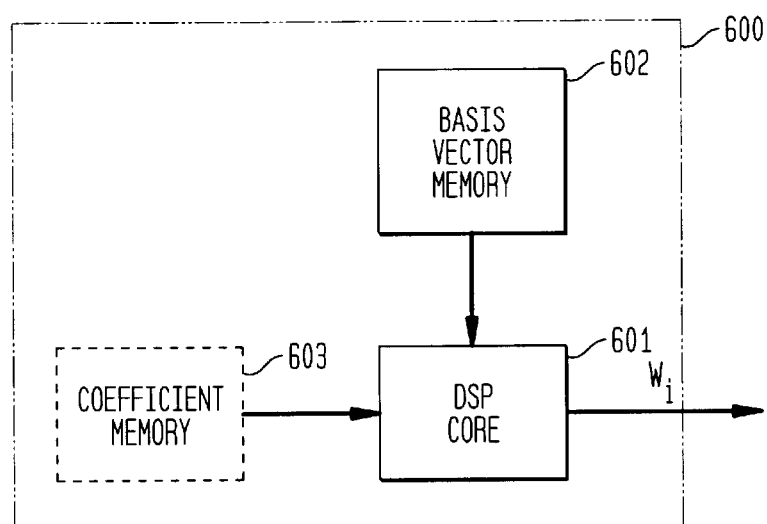
FIG. 6 shows an alternative circuit of an orthogonal sequence generator in accordance with the present invention.

FIG. 6 shows an alternative implementation of an orthogonal sequence generator in accordance with the present invention. For the implementation of FIG. 6, the method of generating a requested Hadamard sequence $w_i$ is implemented as processing steps of a software program executed within a DSP 600. Basis vectors may be stored in an optional internal basis vector memory 602 of the DSP, may be stored in an external memory (not shown), or may be generated with real-time processing. Sets of coefficients may be stored in an optional internal coefficient memory 603 of DSP 600, may be stored in an external memory (not shown), or may be generated with real-time processing. Coefficient memory 603 may be omitted if the sets of coefficients used to generate the Hadamard sequences from the set of basis vectors correspond to the bits of the binary values representing matrix row numbers. In either case, the software program is executed by a DSP core processor 601, which reads basis vectors from the basis vector memory 602 and combines, using modulo-2 addition, the basis vectors based on the set of coefficients.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A sequence generator for generating a selected sequence for processing a communications signal, the sequence generator comprising:

a basis vector generator providing a set of n basis vectors corresponding to a set of m sequences, n being less than m, wherein the set of m sequences are defined by decomposition of each of the m sequences of a matrix into one or more of the n basis vectors in accordance with a corresponding set of coefficients;

a coefficient generator providing a set of coefficients corresponding to the selected sequence of the m sequences; and a combiner for generating the selected sequence using the set of n basis vector and the set of coefficients, wherein the communications signal is processed using the selected sequence.

2. The invention of claim 1, wherein the sequences are orthogonal sequences.

3. The invention of claim 2, wherein the sequences are Hadamard sequences.

4. The invention of claim 1, wherein the basis vector generator includes a memory storing representations of the set of n basis vectors, the basis vector generator providing the representations when read from the memory.

5. The invention of claim 4, wherein the representations correspond to full basis vectors.

6. The invention of claim 4, further including a logic circuit, and wherein the representations correspond to seeds, from which the logic circuit generates the basis vectors.

7. The invention of claim 1, wherein the basis vector generator is a processor generating the set of n basis vectors during real-time processing.

8. The invention of claim 1, wherein the coefficient generator includes a memory storing the set of coefficients, the coefficient generator providing the set of coefficients when read from the memory.

9. The invention of claim 1, wherein the coefficient generator is a processor generating the set of coefficients during real-time processing.

10. The invention of claim 9, wherein the set of coefficients corresponds to an index of the selected sequence in the set of m sequences.

11. The invention of claim 1, wherein the combiner comprises:

a plurality of multiplexers (MUXs), each MUX receiving a corresponding basis vector and corresponding coefficient, and each MUX providing the corresponding basis vector based on a value of the corresponding coefficient;

an adder coupled to the plurality of MUXs, the adder combining, modulo-2, each basis vector provided by the plurality of MUXs.

12. A method for processing a communications signal, comprising the steps of:

(a) providing a set of n basis vectors corresponding to a set of m sequences, n being less than m, wherein the set of m sequences are defined by the step of decomposing each of the m sequences of a matrix into one or more of the n basis vectors in accordance with a corresponding set of coefficients;

(b) providing a set of coefficients corresponding to a selected sequence of the m sequences;

(c) generating the selected sequence using the set of n basis vector and the set of coefficients; and (d) processing the communications signal using the selected sequence.

13. The invention of claim 12, wherein the sequences are orthogonal sequences.

14. The invention of claim 13, wherein the sequences are Hadamard sequences.

15. The invention of claim 12, wherein representations of the set of n basis vectors are stored in a memory and step (a) comprises the step of reading the representations from the memory.

16. The invention of claim 15, wherein the representations correspond to full basis vectors.

17. The invention of claim 15, wherein the representations correspond to seeds, from which the basis vectors are generated.

18. The invention of claim 12, wherein the set of n basis vectors are generated during real-time processing.

19. The invention of claim 12, wherein the set of coefficients is stored in a memory and step (b) comprises the step of reading the set of coefficients from the memory.

20. The invention of claim 12, wherein the set of coefficients is generated during real-time processing.

21. The invention of claim 20, wherein the set of coefficients corresponds to an index of the selected sequence in the set of m sequences.

22. The invention of claim 12, wherein step (d) further comprises the step of encoding the communications signal using the selected sequence.

23. The invention of claim 12, wherein step (d) further comprises the step of decoding the communications signal using the selected sequence.

24. The invention of claim 12, wherein step (c) further comprises the step of combining two or more of the basis vectors using modulo-2 addition.

25. An integrated circuit having a sequence generator for generating a selected sequence for processing a communications signal, the sequence generator comprising:

a basis vector generator providing a set of n basis vectors corresponding to a set of m sequences, n being less than m, wherein the set of m sequences are defined by decomposition of each of the m sequences of a matrix into one or more of the n basis vectors in accordance with a corresponding set of coefficients;

a coefficient generator providing a set of coefficients corresponding to the selected sequence of the m sequences; and a combiner for generating the selected sequence using the set of n basis vector and the set of coefficients, wherein the communications signal is processed using the selected sequence.

26. The invention as recited in claim 25, wherein the integrated circuit is included in a modulator of a code division, multiple access transmitter.

27. The invention as recited in claim 25, wherein the integrated circuit is included in a demodulator of a code division, multiple access receiver.

28. A computer-readable medium having stored thereon a plurality of instructions, the plurality of instructions including instructions which, when executed by a processor, cause the processor to implement a method for processing a communications signal, the method comprising the steps of:

(a) providing a set of n basis vectors corresponding to a set of m sequences, n being less than m, wherein the set of m sequences are defined by the step of decomposing each of the m sequences of a matrix into one or more of the n basis vectors in accordance with a corresponding set of coefficients;

(b) providing a set of coefficients corresponding to a selected sequence of the m sequences;

(c) generating the selected sequence using the set of n basis vector and the set of coefficients; and (d) processing the communications signal using the selected sequence.

29. A transceiver including a sequence generator for generating a selected sequence for processing a communications signal, the sequence generator comprising:

a basis vector generator providing a set of n basis vectors corresponding to a set of m sequences, n being less than m, wherein the set of m sequences are defined by decomposition of each of the m sequences of a matrix into one or more of the n basis vectors in accordance with a corresponding set of coefficients;

a coefficient generator providing a set of coefficients corresponding to the selected sequence of the m sequences; and a combiner for generating the selected sequence using the set of n basis vector and the set of coefficients, wherein the communications signal is processed using the selected sequence.

30. The invention as recited in claim 29, wherein the transceiver operates in accordance with a code division, multiple access (CDMA) telecommunications system standard.

31. The invention as recited in claim 30, wherein the CDMA telecommunications system standard is the IS-95 standard.

* * * * *